Figure 1:
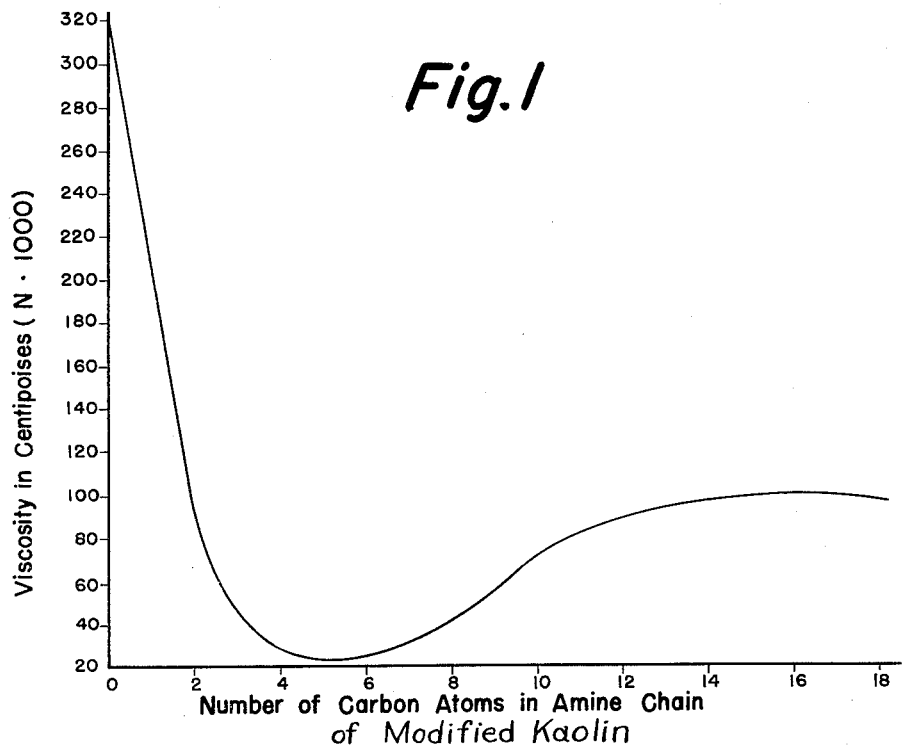

1. Unmodified Kaolin
2. Modified with Butyl Amine Acetate
3. Modified with Hexyl Amine Acetate
4. Modified with Octyl Amine Acetate

INVENTOR.
JAMES R. WILCOX
ATTORNEY

United States Patent Office 2,999,080
Patented Sept. 5, 1961

2,999,080
MODIFIED KAOLIN AS A POLYESTER
RESIN FILLER
James R. Wilcox, Westfield, N.J., assignor to Minerals & Chemicals Philipp Corporation, a corporation of Maryland
Filed Dec. 9, 1958, Ser. No. 779,255
9 Claims. (Cl. 260—40)

This invention relates to an improved filler for resins, particularly those unsaturated polycarboxylic acid-polyhydroxy alcohol polyester resins which, with the incorporation therein of reinforcing materials such as glass fabric or mat, are molded and fabricated into high strength plastic products suitable for use in the manufacture of lightweight transport, prefabricated housing panels, luggage and other items. Such resins are known, and will be referred to herein, as polyester resins.

Polyester resins are obtained from liquid mixtures of polybasic organic acids and polyhydric alcohols, the acids and alcohols reacting to form esters with the esterification continuing until polyesters of high molecular weight result. Unsaturation can be introduced into polyester resins through the use of an unsaturated acid, as for example maleic acid, and/or an unsaturated alcohol, as for example allyl alcohol. Unsaturated polyesters undergo true polymerization through carbon-carbon bonding, without splitting off water or other molecules, and therefore they can be molded at low pressures or even by simple contact.

Finely divided minerals are used as fillers for polyester plastics in many cases, chiefly because: (1) a mineral filler helps to produce a smooth surface finish; (2) it helps to reduce cracking and shrinkage during curing; (3) it helps to hide reinforcing material pattern; (4) it may contribute to high dielectric strength, low water absorption, good chemical and weather resistance; and (5) it offers a medium for controlling the flow properties of the liquid resin-filler mix. With respect to the last-mentioned point, it has been shown experimentally that the presence of certain mineral fillers in liquid polyester resins creates thixotropy in the resulting resin-filler systems, the liquid resins themselves exhibiting Newtonian flow characteristics. The term thixotropy refers to that property of a fluid system which manifests itself in a reversible reduction of apparent viscosity upon disturbance, or shear of the system. When the concentration of certain mineral fillers in a liquid polyester resin reaches a certain level, a measurable shearing stress, known as the yield value, is necessary to induce any flow at all. There are a number of minerals which have been used as resin fillers, among which are finely divided calcium carbonate, magnesium or aluminum silicates and colloidal silica.

Thixotrophy is a valuable property in resin-filler systems. Where matched metal die molding operations are involved, thixotrophy helps to prevent run-out of resin-filler mix before and during die closure since the material will not flow until its yield value is reached or exceeded. However, as soon as the yield value is exceeded by the force of the closing dies, the disturbance due to this force reduces the viscosity of the resin-filler mix to such an extent as to aid in filling of the die cavity and "wetting" of the reinforcing fibers. This viscosity reduction being reversible, when the material has flowed to a point where the shearing stress no longer exceeds the yield value, the apparent viscosity increases and the mixture assumes a thixotropic gel structure, thus preventing flow ahead of the force and eliminating run-out. In addition to its usefulness in die molding operations, thixotropy is highly desirable in gel coating, spray molding and hand lay-ups. In these three types of operations the ability of the resin-filler mix to flow readily while under stress but to remain static under the influence of gravity is of obvious benefit. Mixtures sprayed on irregular molding surfaces must not flow before gelling if a film or laminate of uniform thickness is to be attained.

Although, as pointed out, certain mineral fillers serve an important function in producing thixotropy in liquid resin systems, their use nevertheless gives rise to certain difficulties. For one thing, mineral fillers are commonly of a hydrophilic nature and are often difficult to disperse in organic liquid resins; also, once incorporated therein some tend to flocculate, thus causing unwanted increases in apparent viscosities of the resin-filler mixes. In addition, these fillers have a tendency to settle from resin-filler dispersions during their premolding stage, which behavior is obviously undesirable.

I have discovered that a unique modified mineral filler which disperses readily in liquid polyester resins can be prepared from kaolin clay as hereinafter disclosed in detail. The new modified kaolin of my invention is superior to an unmodified mineral as a resin filler because it can be mixed into a liquid resin with greater ease; at fixed loadings it results in substantially lower resin-filler viscosities while still preserving thixotropy; it can be used at higher loadings due to a much lower degree of flocculation in resin-filler mixes; and it has reduced tendency to settle, or filter, in the liquid resin. The term "loading" refers to the weight of filler in a resin-filler mix, its value being expressed as a percentage of the total resin-filler weight. Loadings as high as 50 percent are readily obtainable with the modified kaolin of my invention for uses involving laminating with glass mat or in hand lay-ups. In the case of filled premix molding compounds, however, loadings as high as 75 percent can be achieved within the scope of my invention. The term "liquid resin" as used herein, refers to the liquid starting mixture from which the final plastic product is formed.

Accordingly, it is the principal object of the present invention to furnish a novel modified kaolin filler for polyester resins, which filler is markedly superior to unmodified mineral fillers in dispersion and flow-control properties.

It is another object of the invention to teach a simple, practical method of preparing the aforesaid modified kaolin.

It is still another object of the invention to achieve liquid polyester resin formulations of good flow properties while using relatively large quantities of filler.

Other objects and features of the invention will be apparent from the description thereof which follows.

The novel resin filler of my invention consists of kaolin clay modified as to surface character by coating it with an amine or an amine salt of a particular class hereinafter delineated. The coating materials suitable for my invention are alkyl amines having a carbon chain of 4 to 8 carbon atoms and alkanoic acid salts thereof wherein the alkyl group contains from 1 to 17 carbon atoms. The coating preferably is accomplished by milling the clay and amine, or amine salt, together.

Although primary, secondary and tertiary amines with branched and/or straight chain alkyl groups having a carbon chain of 4 to 8 carbon atoms are all suitable for purposes of my invention, the use of primary straight chain amines is preferred because of their relative cheapness, ready availability and higher effectiveness. Further, it is not necessary to coat the kaolin with a free amine to obtain the surface modification of my invention, coating with the corresponding amine salts, above-specified, actually resulting in a better product in most cases. I have found the preferred coating technique to be milling by passage through a fluid energy type of mill, although other coating procedures well-known to those in the art can be used within the scope of my invention.

I am well-aware that reactions between high base exchange clays, particularly bentonites and amines are known. I am also aware of the fact that the products of such reaction are surface-modified clays of an organophilic nature, capable of forming gels in organic liquids and have been suggested for use as suspending mediums in paints, thickening agents in greases and reinforcing agents for elastomers. However, the prior art teaches that an amine should contain a straight chain of at least 10 carbon atoms to make it acceptable for imparting organophilic properties to clays through conventional base exchange reactions. In contrast, the amines of my invention must have a carbon chain of 4 to 8 carbon atoms. Thus, it can readily be seen that my invention represents a radical departure from prior art teachings, since amines having from 4 to 8 carbon atoms in their chains produce a resin filler of unique dispersing and flow-control abilities.

In preparing the modified clay of my invention, I prefer to use as a clay starting material a fraction of water-washed kaolin clay having an average particle size corresponding to an equivalent spherical diameter of about 0.5 microns. However, I wish to have it clearly understood that the invention is not limited to this particular size fraction of kaolin.

As previously indicated, I usually prefer to coat the kaolin by milling it with certain salts of amines, rather than with the amine themselves, to obtain the modified clay of my invention. It has been experimentally determined that amine acetates are very well suited to the working of my invention, but any alkanoic acid salt thereof wherein the alkyl group contains from 1 to 17 carbon atoms is satisfactory for my purpose. Thus the amine salt may be acetic acid, propionic acid, butyric acid, valeric acid, caproic acid, enanthic acid, caprylic acid, pelargonic acid, capric acid, lauric acid, myristic acid, or stearic acid. The preferred amine salts for use in my invention, from the standpoint of both performance and economy, are primary straight chain alkyl amine acetates.

It has already been stated that the class of amines within the scope of the present invention are those having a carbon chain of 4 to 8 carbon atoms and no carbon chain greater than 8 carbon atoms. The superiority of kaolin coated with such amines as compared with the same clay coated with amines having shorter and longer carbon chains in resin-filler viscosity repression ability is graphically illustrated in the attached FIGURE 1 which is hereinafter explained in Example I. I have found about 1 percent, based on the weight of the clay, to be the preferred quantity of amine acetate for use in my invention. Higher or lower proportions of the specific amines and their salts can be used however within the scope of the invention. For example, kaolins modified by as little as 0.1 percent, based on the clay weight, of octylamine acetate and as much as 4 percent, same basis, octylamine have proven effective for purposes of my invention. The only requirement with regard to quantity of the amine is that it should be present in an amount to render the kaolin clay organophilic.

Following are examples which are included only for purposes of contributing to a better understanding of the present invention and which are not to be interpreted as limiting the invention to the embodiments set forth therein.

*Example I*

This example illustrates the substantial differences in viscosity between a resin-filler mix made with unmodified kaolin and resin-filler mixes made with the modified kaolins of my invention. It also clearly demonstrates that amines having chains from 4 to 8 carbon atoms in length are greatly superior to shorter and longer chain amines in keeping resin-filler mix viscosities to a minimum.

Samples of water-washed kaolin clay, 2500 grams each, were weighed from water-fractionated clay stock of an average equivalent spherical diameter of 0.5 micron and containing not more than 1 percent of moisture. Into each of these clay samples 1 percent by weight of a primary alkyl straight chain amine acetate, from the group of such acetates containing amine chains of from 2 to 18 carbon atoms, was mixed; enough mixtures being prepared to adequately represent the range of amine chain lengths covered by these limits. The clay and amine acetate mixtures were each milled in a steam jet mill at 600° F. and under 70 p.s.i.g. pressure. The samples of modified clay from the milling operation were mixed into separate batches of the liquid polyester resin Laminac 4128 at a weight ratio of 40 parts of modified clay to 60 parts of resin. Laminac 4128 is a general purpose, unsaturated, styrene modified polyester resin produced and sold by American Cyanamid Company. It is made by esterifying a mixture of maleic and phthalic acids with a 10 percent excess of saturated polyalcohol and blending in styrene. Further, it is representative of the class of polyester resin compositions comprising the polymeric esterification products of polybasic acids and polyhydric alcohols with or without the inclusion of various polymer modifying compounds, said compositions being capable of polymerization to tridimensional solid polymers by cross-linkage through unsaturated carbon to carbon bonds. The various polymer modifying compounds referred to above may be interconnected with the basic constituents of the polymer in the esterification reaction, such as a monobasic acid to obtain polymer termination, or may be a monomer capable of reacting with the polyester to obtain a cross-linked solid polymer, such as styrene in the Laminac 4128. The monomer may also serve as a solvent for the polyester resin, for economy, to modify the properties of the finished product, to obtain a desired degree of liquidity, etc.

Viscosities of the resin-filler mixes at 77° F. were determined using a Brookfield Viscometer at a speed of 10 r.p.m. In addition, the viscosity of a resin-filler mix similar in every respect to those mentioned, except containing unmodified kaolin, was determined in the same fashion. The experimental results are shown on the attached FIGURE 1 as a plot of viscosity, in centipoises, vs. number of carbons in the amine chain.

FIGURE 1 definitely shows a substantial drop in apparent viscosity from the unmodified kaolin clay mix to any mix incorporating the kaolin coated with an amine chain of from 4 to 8 carbon atoms, inclusive. For example, the unmodified kaolin clay mix had an apparent viscosity of about 320,000 centipoises whereas that with the butylamine acetate-treated filler had an apparent viscosity of about 26,000 centipoises, or only slightly more than 1/12 of the former value. FIGURE 1 also clearly shows the decided reduction in resin-filler apparent viscosity attributable to the amines having carbon chains of 4 to 8 carbon atoms, as compared with kaolin coated with alkyl amines having either longer or shorter carbon chains.

*Example II*

This example is illustrative of the differences in apparent viscosity between unmodified clay filler mixes and mixes with the modified clay of my invention, at various filler loadings. Perhaps of more importance, it also shows loading tolerances of various mixes at constant viscosities or, in other words, it proves that substantially greater amounts of my modified filler than of the unmodified clay can be employed without undue increases in apparent viscosities.

In this example samples of resin-filler mixes were prepared using several amine acetates within the purview of my invention together with the kaolin clay of Example I and the resin of Example I. The fillers and subsequent mixes were prepared by the methods described in Example I. The apparent viscosities of the mixes were determined by the method of Example I. The mixes contained the following fillers, respectively: unmodified clay, clay modified by butylamine acetate, clay modified by hexylamine acetate and clay modified by octylamine acetate.

Figure 2:
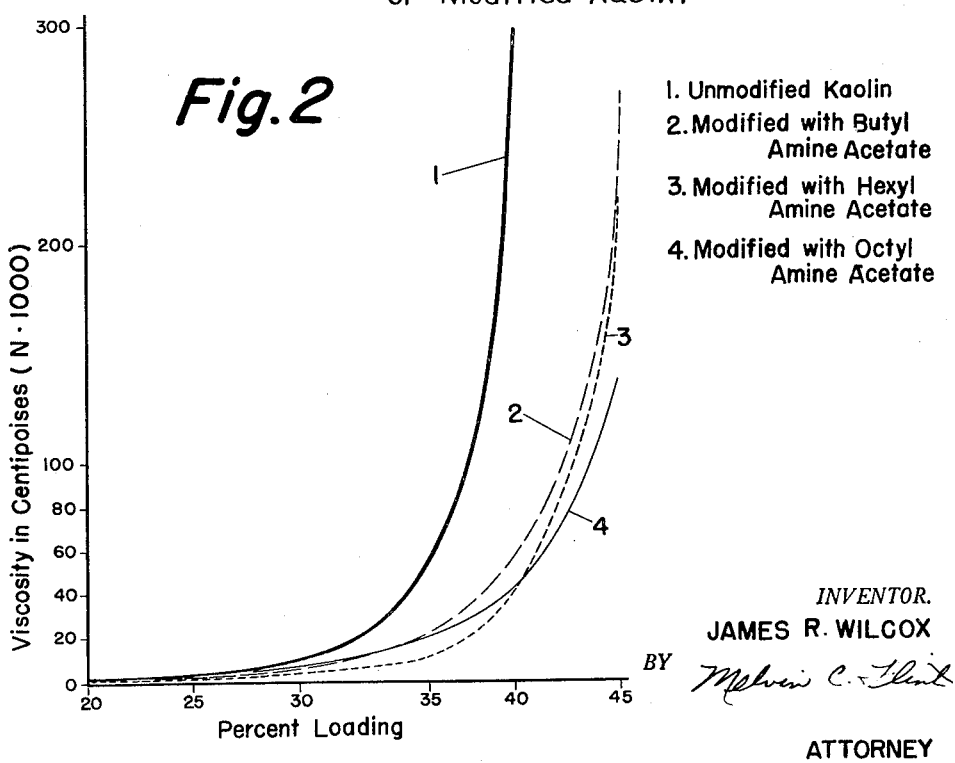

The apparent viscosity of each mix is plotted in FIGURE 2 as a function of percent loading.

FIGURE 2 indicates that at apparent viscosities corresponding to unmodified clay loadings of 35 to 40 percent, inclusive, from 4 to 6 percent higher loadings of modified clays were achieved.

*Example III*

In addition to the modified clays of Examples I and II, clays modified with amines other than primary straight chain ones were prepared and tested. All of these modified clays were made by the dry milling method of Example I from the same kaolin clay starting material. Each amine was used in the form of its acetate and in an amount equivalent to 1 percent of the clay sample weight. Resin-filler mixes were prepared from the modified kaolins as described in Example I using Laminac 4128 as the resin. Viscosities of the mixes were determined with a Brookfield Viscometer under the conditions specified in Example I. The filler (modified kaolin) loading of each mix was 40 percent. The viscosities of the various mixes are given below.

| Amine: | Viscosity (centipoises) |
|---|---|
| Tertiary butylamine | 67,500 |
| 2-ethylhexylamine | 37,000 |
| Ttertiary butylamine | 67,500 |
| Isopropylamine | 58,000 |

Comparison of the above data with FIGURE 1 points up a definite correlation between the number of amine carbon atoms and the ability to repress apparent viscosities of mixes, regardless of the type of amine employed. For example, the viscosity when using 2-ethylhexylamine modified kaolin (branched chain) is shown to correspond roughly to that when using octylamine modified kaolin; in the same way isopropylamine (branched chain) checks with n-propylamine (straight chain). The two tertiary amines tested show definite viscosity repression advantages but not to the same extent as do their primary counterparts of equal chain length.

Thus, it has been demonstrated that alkyl amines having chains varying in number of carbon atoms between 4 and 8 are decidedly superior to amines outside of these limits for purposes of my invention.

This application is a continuation-in-part of my co-pending application, Serial No. 521,754, filed July 13, 1955, now abandoned.

I claim:
1. A process of preparing a modified kaolin clay suitable for use as a filler for polymerizable unsaturated polycarboxylic acid-polyhydroxy alcohol polyester resin compositions comprising coating kaolin clay with an organic cationic material selected from the group consisting of primary alkyl amines having from 4 to 8 carbon atoms in the alkyl group and alkanoic acid salts thereof wherein the alkyl group contains from 1 to 17 carbon atoms, said organic cationic material being present in an amount sufficient to render the kaolin clay organophilic.

2. A process of preparing a modified kaolin clay suitable for use as a filler for polymerizable unsaturated polycarboxylic acid-polyhydroxy alcohol polyester resin compositions comprising coating kaolin clay with from 0.1 percent to 4 percent of an organic cationic material selected from the group consisting of primary alkyl amines having from 4 to 8 carbon atoms in the alkyl group and alkanoic acid salts thereof wherein the alkyl group contains from 1 to 17 carbon atoms.

3. A process of preparing a modified kaolin clay suitable for use as a filler for polymerizable unsaturated polycarboxylic acid-polyhydroxy alcohol polyester resin compositions comprising coating kaolin clay with from 0.1 percent to 4 percent of octyl amine acetate.

4. A material suitable for use as a filler for polymerizable unsaturated polycarboxylic acid-polyhydroxy alcohol polyester resin compositions comprising kaolin clay coated with an organic cationic material selected from the group consisting of primary alkyl amines having from 4 to 8 carbon atoms in the alkyl group and alkanoic acid salts thereof wherein the alkyl group contains from 1 to 17 carbon atoms, said organic cationic material being present in an amount sufficient to render the kaolin clay organophilic.

5. A material suitable for use as a filler for polymerizable unsaturated polycarboxylic acid-polyhydroxy alcohol polyester resin compositions comprising kaolin clay coated with from 0.1 percent to 4 percent of an organic cationic material selected from the group consisting of primary alkyl amines having from 4 to 8 carbon atoms in the alkyl group and alkanoic acid salts thereof wherein the alkyl group contains from 1 to 17 carbon atoms.

6. A material suitable for use as a filler for polymerizable unsaturated polycarboxylic acid-polyhydroxy alcohol polyester resin compositions comprising kaolin clay coated with from 0.1 percent to 4 percent of octyl amine acetate.

7. A polymerizable unsaturated polycarboxylic acid-polyhydroxy alcohol polyester resin composition containing the filler of claim 4.

8. A polymerizable unsaturated polycarboxylic acid-polyhydroxy alcohol polyester resin composition containing the filler of claim 5.

9. A polymerizable unsaturated polycarboxylic acid-polyhydroxy alcohol polyester resin composition containing the filler of claim 6.

No references cited.

UNITED STATES PATENT OFFICE
CERTIFICATE OF CORRECTION

Patent No. 2,999,980                       September 5, 1961

James R. Wilcox

It is hereby certified that error appears in the above numbered patent requiring correction and that the said Letters Patent should read as corrected below.

Column 1, line 55, for "Thixotrophy" read -- Thixotropy --; line 57, for "thixotrophy" read -- thixotropy --; column 5, line 28, for "Tertiary butylamine------67,500" read -- Tertiary octylamine------57,500 --; line 30, for "Ttertiary" read -- Tertiary --.

Signed and sealed this 3rd day of July 1962.

(SEAL)
Attest:

ERNEST W. SWIDER
Attesting Officer

DAVID L. LADD
Commissioner of Patents